E. W. DEMING.
RANGE FINDER.
APPLICATION FILED NOV. 21, 1918.
1,353,151.
Patented Sept. 21, 1920.
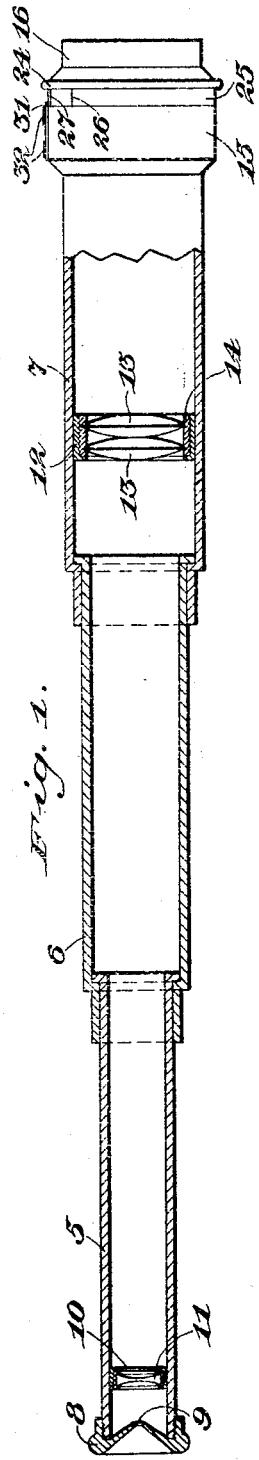
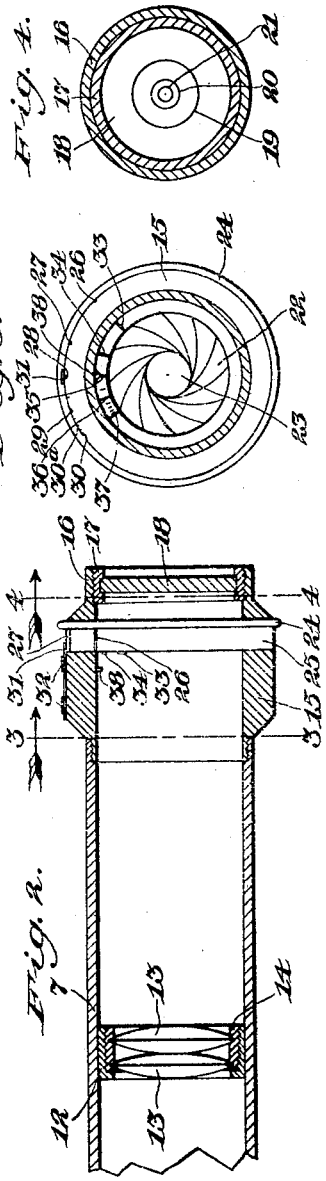
INVENTOR
EDWIN W. DEMING
BY Walton Harrison
ATTORNEY

UNITED STATES PATENT OFFICE.

EDWIN WILLARD DEMING, OF REDDING, CONNECTICUT.

RANGE-FINDER.

1,353,151.  Specification of Letters Patent.  Patented Sept. 21, 1920.

Application filed November 21, 1918. Serial No. 263,483.

*To all whom it may concern:*

Be it known that I, EDWIN W. DEMING, a citizen of the United States, and a resident of Redding, in the county of Fairfield and State of Connecticut, have invented a new and useful Improvement in Range-Finders, of which the following is a full, clear, and exact specification.

The object of my invention is to provide a simple range finder for the use of snipers, hunters and marksmen, which will be easily portable and quickly available where the more refined types of range finders are too cumbersome and unwieldy.

One embodiment of the invention comprises a telescopic tube, preferably having lenses for increasing the visibility of distant objects, the tube being provided with an end to be applied to the observer's eye and with an end to be directed toward a distant object, this last mentioned end carrying an iris diaphragm having an indicator which is calibrated to indicate, in terms of distance units such as yards, the range of the particular object of predetermined size, such for instance as a man standing erect. For this purpose the parts are so proportioned and arranged that when the iris diaphragm is adjusted so that the man or other distant object appears to barely extend across the field of vision as limited by the iris diaphragm, the indicating mechanism associated with the diaphragm will indicate in yards or other units of distance the range of the object.

In using this instrument, the base line of the range finder is the height of the man, or at least is some dimension which, for a given object at a distance, is either known or can be approximated. The observer can in the light of his past experience usually estimate with a fair degree of accuracy the height of an object such as a man, and such estimate is far more reliable than any estimate he might make, by aid of the eye alone, as to the distance of the object across unfamiliar terrain.

As an alternative for the iris diaphragm and the indicator associated therewith, I use a transparent plate provided with annular graduations for enabling the observer to ascertain the range.

Reference is made to the accompanying drawing forming a part of this specification, and in which like letters indicate like parts throughout the several figures.

Figure 1 is a side view, partly in elevation and partly in section, of my improved range finder.

Fig. 2 is a detail, being a fragmentary vertical section through the end of the tube containing the iris diaphragm and parts associated therewith.

Fig. 3 is a section on the line 3—3 of Fig. 2, looking in the direction of the arrow and showing the iris diaphragm.

Fig. 4 is a section on the line 4—4 of Fig. 2, looking in the direction of the arrows and showing the transparent plate with its annular graduations used as an alternative for the iris diaphragm and indicating mechanism associated therewith.

Telescopic sections 5, 6, 7, in this instance three in number, are fitted to each other and together constitute a telescopic tube.

The section 5 carries an eye piece 8, provided with a peep hole 9 is adapted to be brought up to the observer's eye, and this extremity of the tube is accordingly designated as its eye end.

Fitted into the section 5 is a lens holder 10, and detachably mounted within this lens holder is a rectifyng lens 11.

Fitted into the section 5 is a lens holder 12, and detachably mounted within this lens holder are a pair of magnifying lenses 13, carried by a lens mounting 14.

Secured upon the section 7 is an annular head 15 provided with a ring-like flange 16, threaded internally. A ring 17, threaded externally, is detachably fitted into the flange 16, and carries a transparent plate 18, provided with annular graduations 19, 20, 21.

An iris diaphragm appears at 22, and is provided with a central opening 23 of approximately circular form and of variable diameter as is usual with iris diaphragms used for other purposes. The iris diaphragm is provided with a handle ring 24, having an annular flange 25 integral with it, and having graduations 26, 27, 28, 29, 30, cut in its outer peripheral surface. Between these graduations are smaller graduations 30ª.

Mounted upon the annular head 15 is a fixed pointer 31 held in position by screws 32 relatively to which the graduations just mentioned are movable as the handle ring 24 is turned. The graduations represent different diameters for the opening 23, as the iris diaphragm is adjusted by turning the handle ring.

Mounted fixedly upon the inner surface of the annular head 15 is a pointer 38, and adjacent this pointer the flange 25 is provided with graduations 33, 34, 35, 36, 37. These last mentioned graduations and the pointer 38 are self-illuminated, and for this purpose are coated with luminous paint or with some appropriate material containing radium. Thus the graduations 33 to 37 inclusive, which are movable with the handle ring 24, and the fixed pointer 38, are visible within the tube, and may be seen during the darkness of the night. The parts just mentioned constitute an indicating mechanism which has the same general purpose as the indicating mechanism consisting of the graduations 26 to 30, inclusive. Either of these two indicating mechanisms may be used as convenience may suggest, the readings in both instances being identical.

The operation of my device is as follows: The parts being assembled as described, the device in the combination shown in Fig. 1 is ready for use. In order to open the iris diaphragm 22 the handle ring 24 is turned in a contra-clockwise direction according to Fig. 3, and in order to reduce the opening 23 to its smallest size the handle ring is turned in the opposite direction, that is in a clockwise direction according to Fig. 3. For the purpose of making a quick reading the transparent plate 18 shown in Fig. 4 is used instead of the iris diaphragm and the indicating mechanism associated therewith.

In order to make a quick reading, however, it is necessary that the iris diaphragm 24 shall be open to its fullest capacity and thus out of the way.

Assuming that the device is as just described, the operator, in order to make a quick reading, simply raises the telescopic tube to his eye and looks through it at the distant object, say a man standing erect. The operator notes which one of the circles 19, 20, 21 just spans the height of the man and the ring selected in this manner is the one which indicates the distances or, in other words, establishes the range of the object. For instance, if the circle 21 denotes a thousand yards, the circle 20 five hundred yards, and the circle 19 two hundred yards, then a man standing erect and seen at a distance through the plate 18 would be a thousand yards, five hundred yards or two hundred yards distantly, accordingly as his height spanned the circle 21, the circle 20 or the circle 19. If desired, the full width of the opening may be used as indicating a particular distance, say one hundred yards.

In order to use the iris diaphragm, however, the procedure is somewhat different. The operator levels the telescopic tube upon the distant object and then, by turning the handle ring 24, brings the iris diaphragm 22 into such combination that its opening 23 barely spans the height of the man. When this is done a reading is made and this reading gives the distance of the man or other object. The pointer 31 and the graduations 26, 27, 28, 29, 30 together constitute an indicating mechanism for determining the distance or range, and this indicating mechanism is adapted for use in the day-time or when there is a good light.

If, however, the light is poor or the device is used upon a dark night, or even if the operator, for any reason, does not wish to remove his eye from the telescopic tube, he can see within the barrel the indicating device consisting of the fixed pointer 38 and the graduations 33, 34, 35, 36 and 37 immediately adjacent thereto, as these indicating members are self-illuminating.

I do not limit myself to the precise arrangement shown, as variations may be made therefrom without departing from the spirit of my invention.

I claim:

1. The combination of a telescopic tube provided with an eye end and with an object end, mechanism controllable at the will of the operator for varying the cross diameter of the opening at said object end, indicating means connected with this mechanism and disposed exteriorly of said tubular member for facilitating readings when there is a good light, and other indicating means located inside of said tube and illuminated for the purpose of facilitating readings in the darkness within the tube.

2. In a range finder the combination of a tubular member through which objects at a distance may be observed, an iris diaphragm carried by said tubular member for limiting the field of vision through which said objects are observed, indicating mechanism connected with this iris diaphragm and disposed exteriorly of said tubular member for facilitating readings when the light is good and other indicating mechanism located within said tube and self-illuminated for the purpose of facilitating readings notwithstanding the darkness within said tube.

3. The combination of a telescopic tube provided with an eye end and with an object end, mechanism controllable at the will of the operator for varying the cross diameter of the opening at said object end, and indicating mechanism located within said tube, and illuminated for the purpose of facilitating readings in the darkness within the tubes.

4. A range-finder comprising a tubular member through which a distant object may be observed, an iris diaphragm connected with said tubular member, and provided with an opening of variable size, mechanism controllable at the will of the operator, for actuating said iris diaphragm so as to cause said opening therein to barely span a known dimension of said object, and indicating means connected with said mechanism and located within said tube, for the purpose of indicating the range of said distant object when its said known dimension is thus barely spanned by said opening, said indicating means being provided with self-illuminated indicating marks visible in the darkness of said tube.

EDWARD WILLARD DEMING.